July 25, 1939.  R. J. THOMPSON  2,167,143
AIRCRAFT
Filed May 18, 1938  3 Sheets-Sheet 1
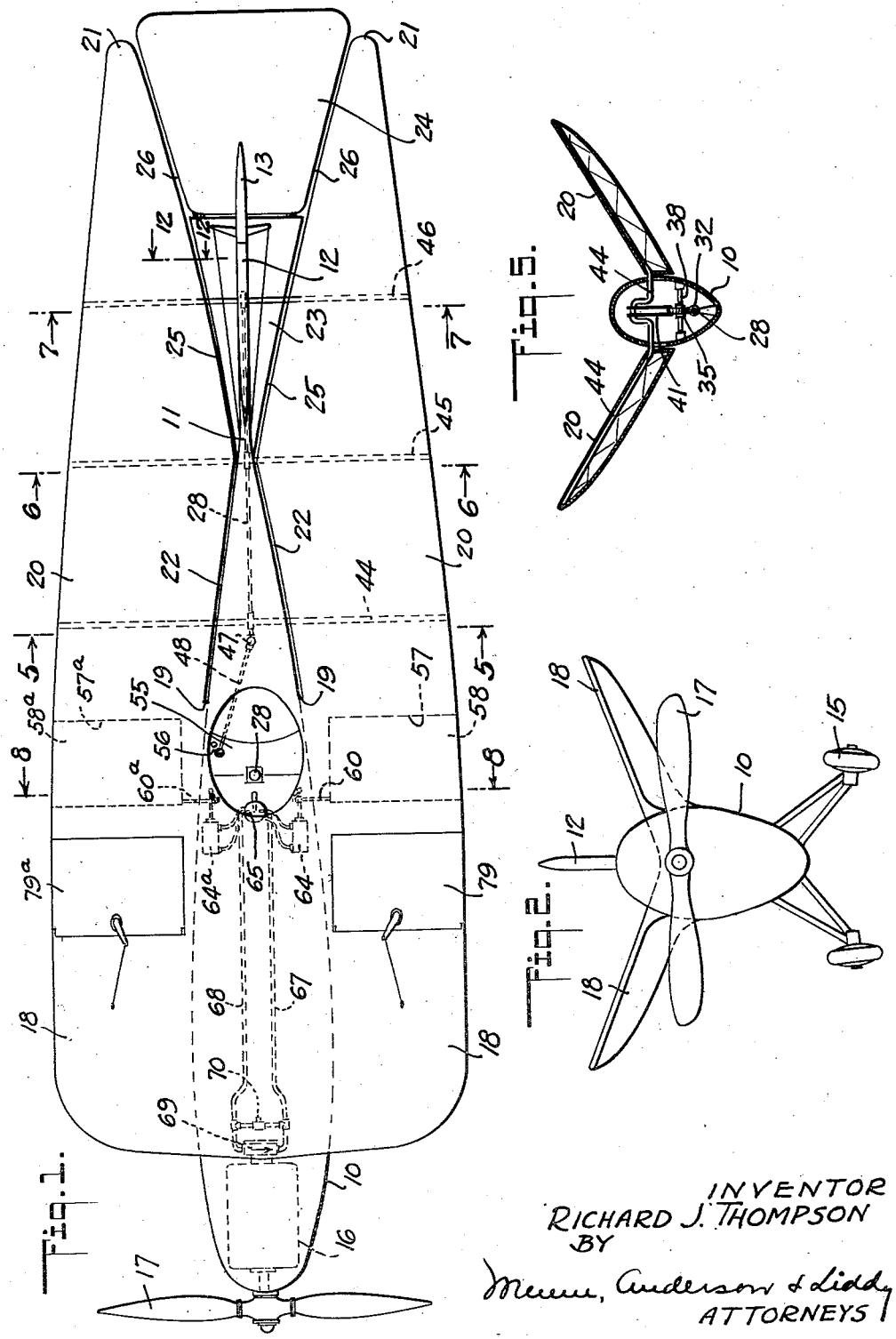
INVENTOR
RICHARD J. THOMPSON
BY
Munn, Anderson & Liddy
ATTORNEYS

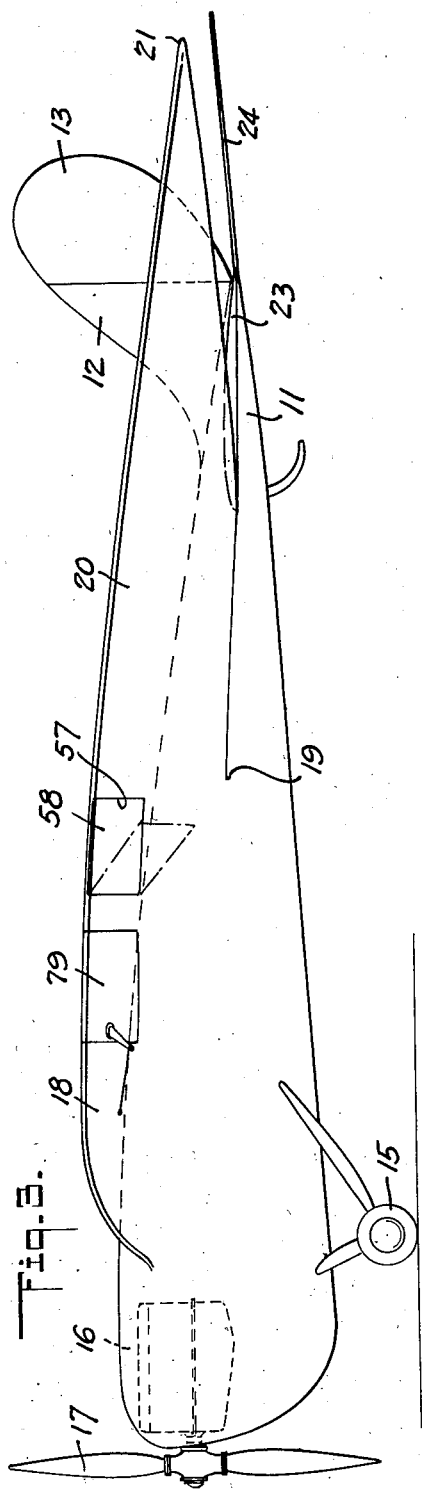

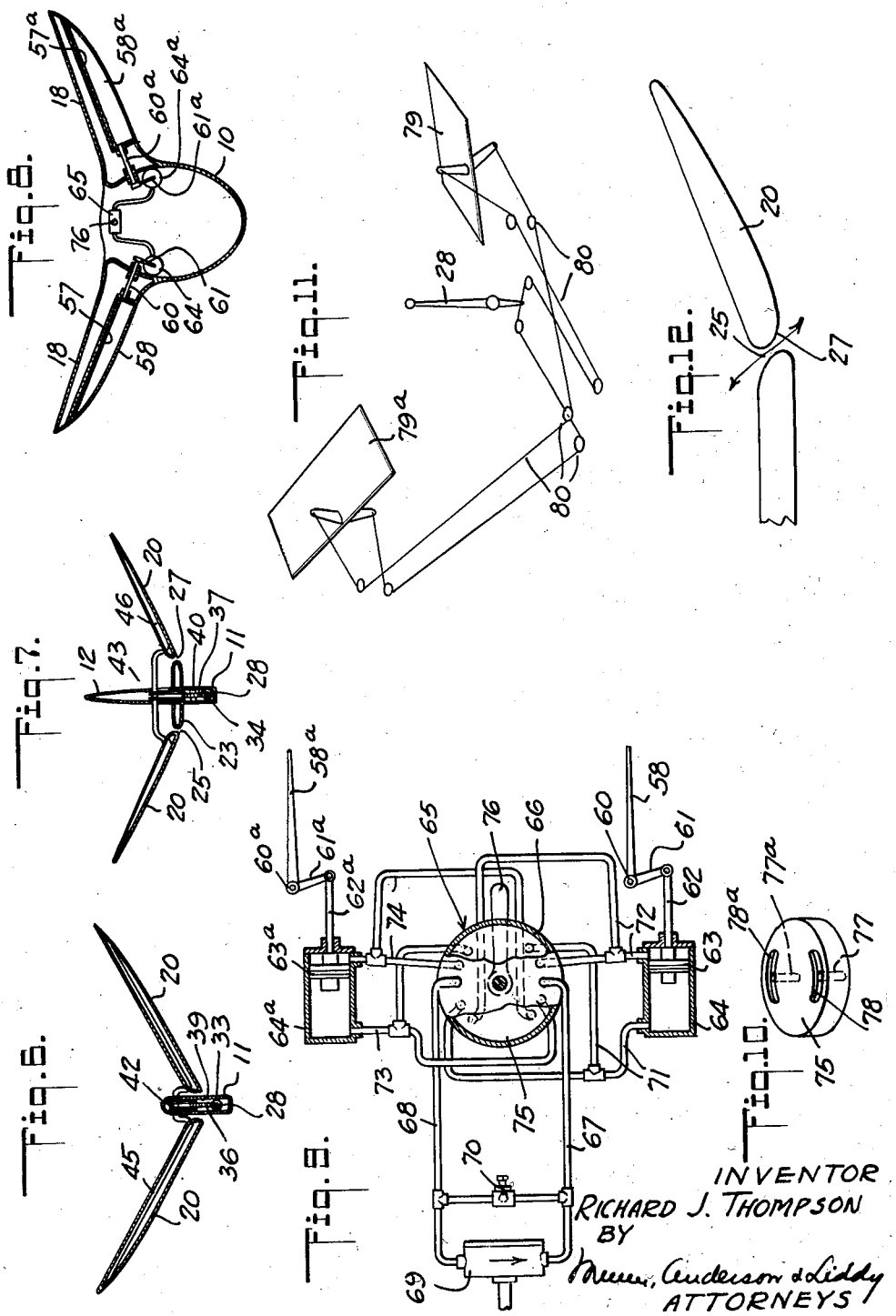

Patented July 25, 1939

2,167,143

UNITED STATES PATENT OFFICE 2,167,143

AIRCRAFT

Richard J. Thompson, Bakersfield, Calif.

Application May 18, 1938, Serial No. 208,650

4 Claims. (Cl. 244—13)

REISSUED
JUN 18 1940

This invention relates generally to aeronautics, and more particularly to heavier-than-air craft.

An object of this invention is to provide a heavier-than-air craft which is structurally characterized by lifting surfaces whose chords greatly exceed their spans, and by relatively long keel-forming surfaces on the fuselage of the craft, whereby to materially increase directional stability, reduce head resistance, and cheapen as well as simplify the construction of the craft by enabling the wing spars to be shortened and full cantilever bracing simplified, all to the end of producing an aircraft which will be inherently stable and positively spin-proof.

Another object of the invention is to provide a heavier-than-air craft, the wings of which can be variably cambered under the control of the pilot, in order to obtain a maximum camber for maximum lift in taking off or climbing, and a minimum camber for minimum lift with a reduction in parasitic drag in flight, so as to effect an increase in the speed of the craft, all in such manner as to permit the wings to be constructed as flat surfaces capable of being flexed to obtain the desired camber.

A further object of the invention is to provide an aircraft which, by its novel wing and fuselage structures, enables the motor or motors to be located amidship without materially affecting the center of gravity or the distribution of weights; enables loads to be safely distributed over the full length of the structure so as to increase the safety factor of the ship and make more usable space available; and permits the craft to be placed in a stalled attitude and to lose altitude at a controlled speed in a vertical plane without any danger of spinning, all while enabling the pilot at any time during such a maneuver to regain fast forward flight without the necessity of nosing the ship downwardly with the attendant loss of altitude.

Another object of the invention is to provide an aircraft in which the wing structure embodies means enabling the craft to be safely stalled into a landing, or to be slipped out of a stall by destroying the lift on at least a portion of one wing or the other with the consequent creation of a highly rarefied air pocket under the respective wing into which the tail end of the craft slips so as to enable the craft to safely make a sharp turn about its nose as a center.

Still another object of the invention is to provide an aircraft wherein the relationship of its horizontal stabilizer, elevators and/or wing tips enables full control of the craft to be maintained at or below a stalling speed, due to a Venturi action created in clearance slots or spaces between these elements, which action sets up a current of high velocity air permitting the craft to settle vertically while retaining control of the elevators, so that by opening the throttle and moving the stick forward, forward speed may be regained, or, in the event of a power plant failure, the same effect can be obtained by a similar maneuver.

With these and other objects in view, one form of the invention will be described in the following specification, and the novel features pointed out in claims.

In the accompanying drawings,

Figure 1 is a plan view of the aircraft embodying this invention;

Figure 2 is a view of the aircraft in front elevation;

Figure 3 is a view of the aircraft in side elevation;

Figure 4 is a view of the aircraft in side elevation and partly in section;

Figures 5, 6, 7 and 8 are transverse sectional views taken, respectively, on the lines 5—5, 6—6, 7—7 and 8—8 of Figure 1;

Figure 9 is a diagrammatic view of a hydraulic control mechanism for wing flaps embodied in the invention;

Figure 10 is a perspective view of a valve member embodied in the hydraulic control mechanism;

Figure 11 is a perspective view of the aileron controls;

Figure 12 is an enlarged fragmentary detail view taken on the line 12—12 of Figure 1, and illustrating the structure by which the Venturi effect is obtained.

Referring specifically to the drawings, the aircraft embodying this invention comprises a streamlined fuselage 10 which is relatively long and narrow and merges at its tail end into a keel 11 from which projects upwardly a vertical stabilizer 12 having mounted thereon a rudder 13, the controls of which are conventional and have been omitted for the sake of clearness.

The fuselage is provided with a suitable landing gear 15, and in the present instance a single engine 16 having a direct driven tractor propeller 17 is mounted in the nose of the fuselage. However, it will be understood that by the provision of this invention, the engine can be mounted amidships without materially affecting the center of gravity or the distribution of weights on the craft.

Supported from the fuselage at a suitable angle of attack, and with a predetermined positive dihedral, are right- and left-hand wings 18—18, preferably constructed to normally provide flat lifting surfaces, the chords of which greatly exceed their spans so that the wings are relatively long and narrow in a direction longitudinally of the fuselage, whereby to reduce head resistance to a minimum and increase directional stability sufficiently to co-act with the fuselage and particularly its keel portion 11 in rendering the craft inherently stable.

From their leading edges to the points indicated at 19—19 the wings are rigid and are rigidly attached to the fuselage, whereas from the points 19 to their trailing edges or tips, the wings are free of the fuselage to provide portions 20 which are flexible to a limited extent.

The free portions of the wings taper to their rounded trailing edges 21, and closely follow the contour of the fuselage 10 to provide intervening narrow slots 22 between the fuselage and wings approximately to the forwad end of the keel portion 11 from which the wings diverge to accommodate a horizontal stabilizer 23 and an elevator 24 pivotally mounted thereon and provided with conventional controls which are omitted for the sake of clearness. The confronting spaced edges of the wings, horizontal stabilizer and the elevator provide narrow slots 25 and 26, and it will be noted from a consideration of Figure 12, which is a typical section across either the slots 22, 25 or 26, that the aforesaid confronting edges are so shaped as to co-act in defining a venturi 27, the effect of which is to enable full control of the craft to be maintained at or below stalling speed, by setting up a zone of high velocity air about the control surfaces, permitting the craft to settle vertically while retaining control of the elevators. Thus, upon opening the throttle and moving the stick 28 forward to depress the elevator, forward speed can be regained, or should there be a power plant failure the same effect can be obtained by a similar maneuver.

The flexibility of the portions 20 of the wings is utilized to variably camber the wings in order to enable maximum cambering for maximum lift to be obtained to aid in the taking off or when climbing, and minimum cambering for minimum lift for high speed forward flight.

For this purpose there is shown in Figures 1, 4, 5, 6 and 7 a manually operable control mechanism which comprises a shaft 28 extending longitudinally and centrally in the fuselage 10, and journaled at intervals in pairs of bearings 29, 30 and 31. Fixed to the shaft 28 between the respective pairs of bearings are worms 32, 33 and 34, respectively, meshing with worm wheels 35, 36 and 37 fixed to shafts 38, 39 and 40, respectively, which shafts are journaled in suitable bearings in the fuselage.

Pivotally connected to the worm wheels 35, 36 and 37 are pairs of connecting rods 41, 42 and 43, respectively, which are connected to rigid transverse frame members 44, 45 and 46, forming part of the framework of the flexible portions 20 of the wings 18.

The forward end of the shaft 28 is connected by a universal joint 47 to a shaft 48, the forward end of which is journaled in a bearing 49 and has fixed thereto a bevel gear 50 meshing with a second bevel gear 51 fixed to a vertical shaft 52 journaled by bearings 54—54 at one side of the cockpit 55.

The upper end of the shaft 53 is provided with an operating handle 56, and it is to be noted that in order to effect a predetermined cambering of the flexible portions 20 of the wing 18, the worms 32, 33 and 34 and their mating worm wheels can be of progressively increasing pitches, or in lieu thereof the rods 41, 42 and 43 can be connected to the respective worm wheels 35, 36 and 37 at progressively increasing distances from the center of the shafts 38, 39 and 40, respectively.

Thus it will be clear that by operation of the handle 56, the flexible portions of the wings can be variably cambered to vary the lift from a minimum for high speed forward lift to a maximum for the take-off and climbing.

Immediately forward of the flexible portions 20, the undersides of the wings 18 are provided with rectangularly shaped recesses 57—57a in which are pivotally mounted on transverse axes, flaps 58 and 58a. These flaps are adapted to fit closely in the recesses so as to be flush with the undersurface of the wings, and are manually controlled by a suitable hydraulic mechanism (Figures 9 and 10) to enable them to be swung downwardly independently of each other to occupy an active position.

For this purpose the pivot shafts 60 and 60a of the respective flaps 58 and 58a are extended through the opposite sides of the fuselage and have fixed thereto arms 61—61a connected to the rods 62—62a of pistons 63—63a working in hydraulic cylinders 64—64a suitably supported in fixed positions in the fuselage.

A hydraulic valve 65 includes a cylindrical body 66 to one side of which is connected at diametrically opposite locations, feed and return conduits 67 and 68 leading from opposite sides of a pump 69 constantly driven by the engine 16, a suitable spring loaded by-pass valve 70 being connected across the conduits to enable the liquid to circulate idly in the system when the valve 65 is closed.

Other conduits 71, 72, 73 and 74 are connected to the opposite side of the body 66 at circumferentially spaced locations and are connected to opposite ends of the cylinders 64—64a in the arrangement clearly shown in Figure 9. A closure disk 75 having an operating handle 76 is rotatably mounted in the body and is provided with axial passages 77 and 77a opening at one face of the disk into arcuate channels 78 and 78a, and adapted to co-act therewith in placing either end of either the cylinder 64 or 64a in communication with the feed conduit 67 while the other end of the respective cylinder is connected to the return conduit 68, according as the disk is rotated to various positions.

Thus, either of the flaps 58 and 58a can be moved to an active position wherein the flap is disposed at an angle to the respective wing to extend downwardly and rearwardly thereof so as to destroy the lift under the respective wing from the flap to the tip of the wing, thereby enabling the craft to be slipped out of a stall and to safely execute a sharp turn about its nose as a center.

Forwardly of the flaps 58 and 58a, the wings are cut out to receive ailerons 79 and 79a provided with the conventional arrangement of cable and pulley controls 80 to the stick 28, as clearly shown in Figure 11.

What is claimed is:
1. In an aircraft, a fuselage; wings projecting from the sides of the fuselage; the chords of the wings greatly exceeding the spans thereof so as to reduce head resistance to a minimum; the rearward portions of the wings being free of the fuselage and being flexible in a direction to enable the camber of the wings to be varied; spars secured to said flexible portions of the wings and projecting transversely of the fuselage at spaced locations along the length thereof; a rotatably mounted shaft extending longitudinally in the fuselage; geared connections driven by said shaft and operatively connected to said spars; and means by which said shaft can be rotated, whereby to flex said portions of the wings.

2. In an aircraft, a fuselage; wings projecting from the sides of the fuselage; the chords of the wings greatly exceeding the spans thereof so as to reduce head resistance to a minimum; the rearward portions of the wings being free of the fuselage and being flexible in a direction to enable the camber of the wings to be varied; spars secured to said flexible portions of the wings and projecting transversely of the fuselage at spaced locations along the length thereof; a rotatably mounted shaft extending longitudinally in the fuselage; worms fixed to said shaft; worm wheels rotatably mounted and meshing with the worms; connecting rods pivotally connected to the worm wheels and spars; and means by which said shaft can be rotated, whereby to flex said portions of the wings.

3. In an aircraft, a streamlined body; wings projecting from said body; the chords of the wings greatly exceeding the spans thereof; a horizontal stabilizer projecting from the body between the wings and co-acting with the rear portions of the wings to define narrow slots therebetween of Venturi cross-section; and an elevator mounted on the body and co-acting with further rearward portions of the wings to define narrow slots therebetween of Venturi cross-section for the purpose described.

4. In an aircraft, a streamlined body; wings projecting from said body; the chords of the wings greatly exceeding the spans thereof; a horizontal stabilizer projecting from the body between the wings; an elevator mounted on the body between the wings; and means co-acting with the wings, stabilizer and elevator to cause air at a high velocity to pass therebetween should the craft assume a stalling attitude during flight, so as to enable the craft to settle vertically in the air without loss of control by the pilot.

RICHARD J. THOMPSON.